Feb. 9, 1926. 1,572,198
P. A. FLINN
BACON SKEWER BLOCK
Filed Oct. 30, 1924
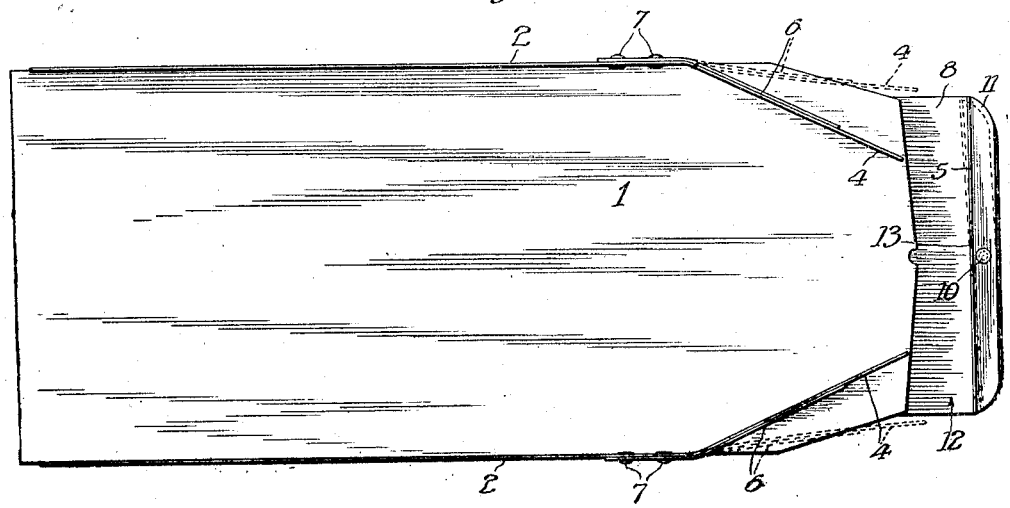
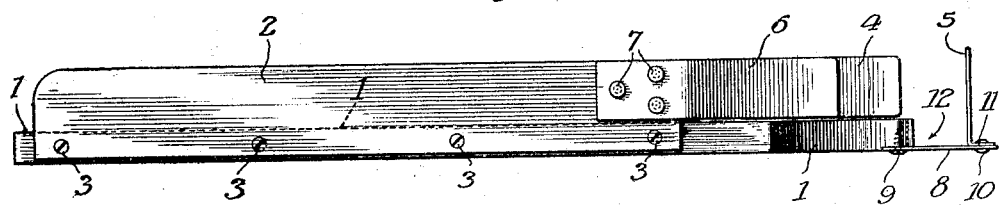
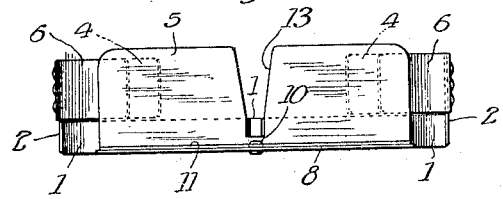
Witness
Martin H. Olsen.
Inventor
Paul A. Flinn
By Rummler & Rummler
Attys Patented Feb. 9, 1926.

1,572,198

UNITED STATES PATENT OFFICE.

PAUL A. FLINN, OF SOUTH ST. PAUL, MINNESOTA, ASSIGNOR TO SWIFT & COMPANY, OF CHICAGO, ILLINOIS, A CORPORATION OF ILLINOIS.

BACON-SKEWER BLOCK.

Application filed October 30, 1924. Serial No. 746,893.

*To all whom it may concern:*

Be it known that I, PAUL A. FLINN, a citizen of the United States of America, and a resident of South St. Paul, county of Dakota, and State of Minnesota, have invented a new and useful Improvement in Bacon-Skewer Blocks, of which the following is a specification.

This invention relates to devices for shaping and crowding into the desired rectangular form, sides of bacon, preliminary to applying the bacon hangers and subjecting the bacon to the smoking operation. The object of the invention is to provide a more conveniently operated means than has hitherto been available for doing this work. It is also a purpose of the invention to provide a side meat skewer board having forming means at the end thereof which will adjust itself to the somewhat angularly cut flank end of the side meat, and which will adjust itself to side meats cut from either side of hogs.

The purposes of the invention are accomplished by a device as shown in the drawing, in which—

Fig. 1 is a plan view of the improved skewer board.

Fig. 2 is a side view of the same.

Fig. 3 is an end view.

Unless some means are provided for compensating for shrinkage by forcing the bacon into a certain form before subjecting it to the smoking operation, the shrinkage may change the shape of the sides of bacon out of the desired rectangular form most suitable for slicing or for marketing in a single piece. The flank end of a side of bacon is cut at an angle suitable for allowing for excessive shrinkage of the flank portion, and this cut, of course, extends at opposite angles on the right and left sides of the hog. The purpose of a skewer board is to meet these conditions and uniformly crowd the bacon into a more or less rectangular form, and to be adapted to engage the inclined cut at the flank.

The device also is arranged to support a bacon hanger in position to receive the flank end of the bacon as the side of the bacon is forced toward the end of the skewer board, the skewer board itself having side walls which are resilient at one end to cooperate in the forming operation. Therefore, in the use of the device a bacon hanger is placed on one end thereof and the side of bacon is slid along the board, being crowded into the desired form during such time, and into a position where the hanger may be caused to grip the bacon at one end.

The construction consists of a flat board having upwardly extending sheet metal side walls secured to the board for about three-fourths of its length, but free for the remainder of the distance along the board, where these side walls terminate in resilient wings normally extending inwardly from the remainder of the side walls. The board is also provided with an upwardly extending end wall, which about midway of its length is pivotally connected with the board so as to be free to swing around a vertical axis and thereby adjust itself to the inclined flank end of a side of bacon.

As shown in the drawing, the skewer block consists of a wood base board 1, having side walls 2, which may be in the form of metal strips secured to the base board 1 by screws 3, but having at one end narrower bent portions 4, extending inwardly over the board 1 in order to resiliently compress the sides of the flank ends of side meats, as the side meats are pushed along the board toward the end wall 5. The resilient portions 4 of the side walls are reinforced by spring strips 6 secured to the side walls by rivets 7. The end wall 5 is pivotally mounted on a metallic extension 8 of board 1. This extension is secured to the board 1 by a plurality of screws 9, and carries a vertically extending rivet or pin 10 passing through a bent flange 11 at the bottom of end wall 5. The end wall 5 is free to move around its pivot 10, as indicated by the dotted lines in Fig. 1. It, therefore, adjusts itself to the angularly cut ends of side meats when the side meats are pushed along the board into contact therewith.

In the use of the device, the bacon hanger, not shown, is placed in the space 12 between the end of board 1 and wall 5, above the extension 8 of the board, the handle of the hanger extending through a cut 13 in wall 5. A side of bacon is placed on the board with the flank end nearest the end wall 5. The side of bacon is pushed toward the end wall, forcing the resilient portions 4 of the side walls outwardly, these resilient portions coacting with the end wall 5 to crowd the side of bacon into the desired form, when the hanger is then caused to grip the bacon and the latter is removed by means of the hanger. The resilient portions or wings 4 of the side walls are tilted in a trifle at the upper edge to prevent the side meats from crowding up over same. By means of a board such as described, having the resilient wings and the adjustable end piece, the flank ends of the side meats are squared and flattened so that the same does not have an irregular appearance after it is smoked, and results in less waste in slices cut from this end.

Although but one specific embodiment of this invention has been herein shown and described, details of the construction shown may be altered or omitted, without departing from the spirit of this invention as defined by the following claims.

I claim:

1. A skewer block of the class described, comprising a flat board having upwardly extending side walls, and an end wall, means for supporting said end wall, comprising a pivot perpendicular to the board whereby said end wall may swing around a vertical axis.

2. A skewer block of the class described, comprising a flat board having upwardly extending side walls, and an end wall, means for supporting said end wall, comprising a pivot perpendicular to the board whereby said end wall may swing around a vertical axis, said side walls terminating in resilient portions which normally extend inwardly at an angle to the remainder of the side walls.

3. A skewer block of the class described, comprising a board, side walls rigidly secured to said board for a portion of its length, resilient extensions of said side wall adapted to move inwardly and outwardly over the surface of the board, and an end wall for coacting with said resilient extensions on the side wall in shaping side meats placed between said extensions.

4. A skewer block of the class described, comprising a board, side walls rigidly secured to said board for a portion of its length, resilient extensions of said side wall adapted to move inwardly and outwardly over the surface of the board, and an end wall for coacting with said resilient extensions on the side wall in shaping side meats placed between said extensions, a metallic extension rigidly secured to the bottom of said board, and said end wall being pivotally mounted on said extension whereby the end wall is free to turn around an axis, perpendicular to the board.

5. A skewer block of the class described, comprising a board, side walls rigidly secured to said board for a portion of its length, resilient extensions of said side wall adapted to move inwardly and outwardly over the surface of the board, and an end wall for coacting with said resilient extensions on the side wall in shaping side meats between said extensions, said end wall being notched out or cut away near the center thereof for receiving a bacon hanger.

Signed at South St. Paul, Minnesota, this 22nd day of Oct., 1924.

PAUL A. FLINN.